Feb. 2, 1937. W. A. DUFFIELD 2,069,360
AUTOMATIC POWER TRANSMISSION
Filed Aug. 1, 1934
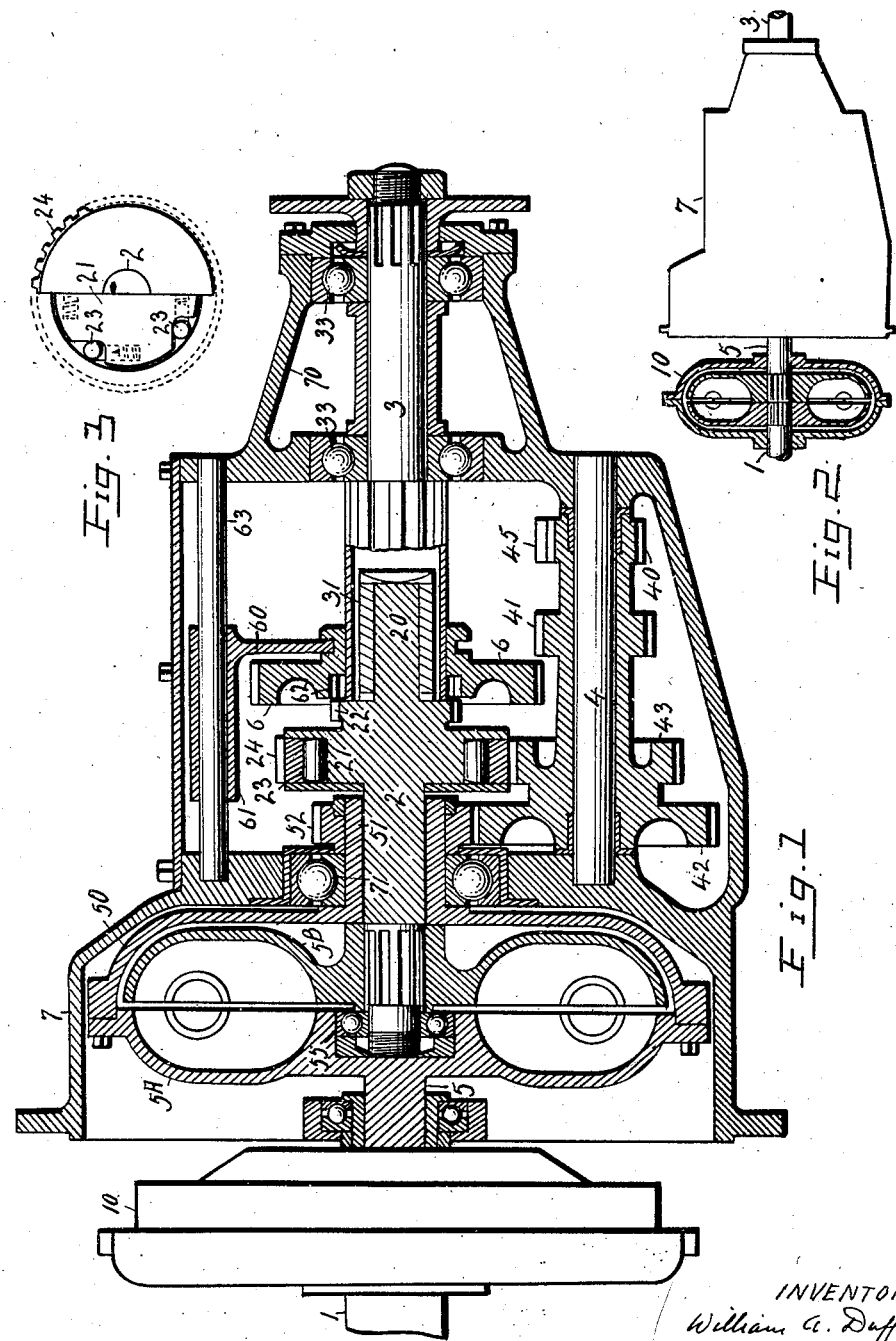

Patented Feb. 2, 1937

2,069,360

UNITED STATES PATENT OFFICE 2,069,360

AUTOMATIC POWER TRANSMISSION

William A. Duffield, Montreal, Quebec, Canada, assignor to Juno Corporation Limited, Montreal, Quebec, Canada Application August 1, 1934, Serial No. 738,023

6 Claims. (Cl. 74—330)

This invention relates to variable speed power transmission and particularly to apparatus adapted to be employed in automobiles.

The apparatus as disclosed hereinafter may be semi-automatic or completely automatic.

It includes one or more fluid couplings of the Fottinger type combined with gearing of the well known countershaft type.

The object of the invention is to provide a power transmission at variable speeds of simple and inexpensive construction which will operate either automatically or semi-automatically.

A further object is to eliminate to a large extent the hand and foot control at present required in controlling the transmission of automobiles.

A further object is to provide an apparatus whereby the driving speed and power are adjusted to the load.

Other objects will be referred to hereinafter.

Reference will be made to the accompanying drawing in which:

Figure 1 is a vertical section of a two speed automatic transmission.

Figure 2 shows a fluid coupling clutch.

Figure 3 shows an overrunning clutch partly in section.

Referring to Figure 1 the motor crankshaft 1 is coupled to the stub shaft 5 by the clutch 10 of the conventional type. The stub shaft 5 carries the member 5A of the fluid coupling, to which is secured by bolts the bowl or housing 50 with its sleeve 51. This sleeve 51 is mounted on the main shaft 2 and carries the gear 52. The sleeve 51 is journalled in the ball bearing 71 on the frame 7.

The gear 52 is in constant mesh with the gear 42 journalled on the countershaft 4.

Integral with the gear 42 on the countershaft 4 are the reverse gear 40, the low speed or emergency gear 41 and the second speed gear 43.

The gear 43 is in constant mesh with the overrunning ring gear 24 on the overrunning clutch 21 on the main shaft 2.

The tail shaft 3 journalled in bearings 33 in the extension 70 of the casing 7, is bored to carry roller bearings 31 in which the end 20 of the main shaft 2 is journalled.

A sliding gear 6 splined on the tail shaft 3, is controlled by the fork 60 and sleeve 61 sliding on the rod 63 and is operated by the usual hand lever.

The gear 6 also carries the clutch element 62 adapted to mesh with the clutch element 22 on the main shaft 2, when coupled by the fork 60.

The member 5B of the fluid coupling is splined on the main shaft 2 beyond the bearings 71 in the casing 7 and sleeve 51. The end of the main shaft 2 is journalled in the bearing 55 in a recess in the member 5A.

Figure 1 shows the gear 6 in neutral.

Figure 3 shows one form of an overrunning clutch 21 with roller ratchets 23 and ring gear 24.

The operation of the mechanism is as follows:—

The motor driven shaft 1 having been started, the gear 6 is moved to engage the main shaft 2 through the clutch element 62 and clutch element 22.

When the clutch 10 is let in the drive is taken through the stub shaft 5, the fluid coupling member 5A, the bowl 50, sleeve 51, gear 52 and gear 42 on the countershaft 4, thence through the gear 43 through the ring gear 24 of the overrunning clutch 21 to the main shaft 2. The clutch 10 may be of the Fottinger type as shown in Fig. 3.

While the speed of the main shaft 2 is slow the ring gear 24 grips the roller ratchets 23 and the drive passes through the gear 6 to the tail shaft 3.

As the member 5A speeds up it gradually couples with the member 5B and the main shaft 2 takes up the drive and releases the roller ratchets 23 permitting the ring gear 24 to slip. The drive is then direct from the stub shaft 5 to the tail shaft 3 through the main shaft 2.

As the speed of the drive decreases the reverse takes place and the direct drive is transferred to the countershaft drive.

Owing to the fluid coupling between the members 5A and 5B and the overrunning clutch 21 these changes take place smoothly and without any manual control but are automatic.

By this means the output of power and speed of the motor as controlled by the accelerator, is the regulator of the power and speed of the drive as desired or required.

The load governs the rate of increase of speed and the power is applied as required.

The drive automatically changes its course as the speed increases until it becomes a direct shaft drive. These changes take place smoothly and without violent strain on any part of the mechanism. Owing to the lag in the fluid couplings, the changes are always without shock or noise.

Although the devices above described are particularly adapted to automobiles, they are also adapted to other power drives. The countershaft gearing may be varied to suit special requirements. The advantage of a gradual transmission of power from a prime mover to a driven mechanism without shock or sudden strain is clearly obvious. It is of great value in reducing the amount of horse power required in starting mechanism with a heavy load. The effect of the automatic gear changing and smooth coupling will ensure high efficiency and durability.

I claim:

1. A power transmission, comprising a prime mover, a crank shaft, a stub shaft, a clutch between these shafts, the stub shaft carrying one member of a fluid coupling of the Fottinger type, a main shaft splined to the other member, a housing and sleeve secured to the first member, a pinion keyed to the sleeve, a countershaft, a gear in constant mesh with the pinion, a drive gear, a low speed gear and a reverse gear, said gears being integral and journalled on the countershaft, an overrunning clutch with a ring gear on the main shaft, having its ring gear meshing with the drive gear, a splined tail shaft journalled on an extension of the main shaft, a sliding gear on the splined tail shaft, a clutch element on the sliding gear, adapted to mesh with a clutch element on the main shaft, forming a coupling between the main shaft and the sliding gear and means to couple the sliding gear to the main shaft, the low speed gear or the reverse gear.

2. A power transmission comprising a prime mover having a crank shaft, a clutch thereto, a stub shaft from the clutch carrying one member of a hydraulic coupling of the type specified, a main shaft carrying the other member, a countershaft having a set of integral gears thereon, a sleeve extension to the first member having a pinion thereon, in constant mesh with a gear on the countershaft, an overrunning clutch with a ring gear on the main shaft having its ring gear in constant mesh with a second gear on the countershaft, a tail shaft, a sliding gear thereon, a clutch element on the sliding gear meshing with a clutch element on the main shaft, forming a coupling between the main shaft and the tail shaft.

3. A power transmission comprising a prime mover, a fluid coupling of the Fottinger type, a clutch between the prime mover and one member of the fluid coupling, a main shaft carrying the other member, countershaft gearing between the first member and the main shaft, including constant meshing gears and an overrunning clutch, a tail shaft journalling the end of the main shaft, a sliding gear splined on the tail shaft, and a clutch element on the sliding gear, adapted to mesh with a clutch element on the main shaft and to form a coupling between the main shaft and the tail shaft through the sliding gear.

4. In a power transmission the combination of a stub shaft coupled to a prime mover, a fluid coupling, one member of the fluid coupling mounted on the stub shaft, a main shaft carrying the other member, a housing about the second member secured to the first member and having a sleeve over the main shaft, a pinion on the sleeve, a countershaft, a set of gears thereon, one gear in constant mesh with the pinion, an overrunning gear on the main shaft in constant mesh with a countershaft gear, a tail shaft journalling the end of the main shaft, a sliding gear on the tail shaft adapted to couple the main shaft to the tail shaft or to engage a gear on the countershaft.

5. In a power transmission, a fluid coupling, one member secured to a prime mover and having a housing, a sleeve and a pinion, the other member mounted on a main shaft, a countershaft, a set of integral gears thereon one of which meshes with the pinion, and another meshes with an idler, an overrunning gear on the main shaft meshing with a countershaft gear, a tail shaft journalling the end of the main shaft, a sliding gear thereon adapted to mesh with a gear on the main shaft, or to mesh with the idler.

6. A power transmission comprising a prime mover, a fluid coupling, means to clutch one member of the fluid coupling to the prime mover, a main shaft carrying the other member, a housing outside the second member of the fluid coupling, connecting the first member with a sleeve and pinion journalled on the main shaft, a tail shaft journalled axially with the main shaft, a sliding gear splined thereon, a countershaft, integral countershaft gearing, one gear meshing with the pinion, a second gear meshing with a ring gear of an overrunning clutch on the main shaft, and a third gear adapted to mesh with the sliding gear on the tail shaft, and a clutch between the sliding gear and the main shaft adapted to close when the sliding gear is not in mesh with the third countershaft gear, a fourth countershaft gear meshing with an idler, such idler adapted to mesh with the sliding gear for reverse drive.

WILLIAM A. DUFFIELD